(12) United States Patent
Kim et al.

(10) Patent No.: US 9,252,186 B1
(45) Date of Patent: Feb. 2, 2016

(54) PIXEL ARRAY AND DISPLAY DEVICE (71) Applicant: BOE TECHNOLOGY GROUP CO., LTD., Beijing (CN)

(72) Inventors: Heecheol Kim, Beijing (CN); Chulgyu Jung, Beijing (CN); Hyunsic Choi, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 14/518,163

(22) Filed: Oct. 20, 2014

(30) Foreign Application Priority Data

Aug. 19, 2014 (CN) .......................... 2014 1 0409400

(51) Int. Cl.
  H01L 23/62 (2006.01)
  H01L 27/15 (2006.01)

(52) U.S. Cl.
  CPC ................................... H01L 27/156 (2013.01)

(58) Field of Classification Search
  CPC . H01L 21/563; H01L 21/762; H01L 21/7624; H01L 23/4951; H01L 29/861; H01L 29/6603; H01L 51/0508; H01L 51/5296; H01L 27/124; H01L 27/146; H01L 26/1463; H01L 27/3211; H01L 27/11898; H01L 27/0814; H01L 27/1251; H01L 27/3248

USPC .............. 257/59, 293, 359, 414, 687, 72, 79, 257/288, 678, 918, E21.006, E21.051, 257/E21.053, E21.114, E21.189, E21.32, 257/E21.352, E21.4, E21.411, E21.527

See application file for complete search history.

(56) References Cited

U.S. PATENT DOCUMENTS

| | | | | |
|---|---|---|---|---|
| 5,646,702 A | * | 7/1997 | Akinwande et al. | 349/69 |
| 6,140,983 A | * | 10/2000 | Quanrud | 345/55 |
| 6,339,417 B1 | * | 1/2002 | Quanrud | 345/98 |
| 2002/0101396 A1 | * | 8/2002 | Huston et al. | 345/87 |

* cited by examiner

*Primary Examiner* — David Nhu
(74) *Attorney, Agent, or Firm* — Collard & Roe, P.C.

(57) ABSTRACT

A pixel array and a display device are provided. The pixel array includes a two-dimensional array that is formed by arranging a plurality of color sub-pixels and a plurality of white sub-pixels in the row direction and in the column direction, the color sub-pixels include color sub-pixels in three different colors. For color sub-pixels in each color in each row, color sub-pixels with the same color in the same row are arranged so that, the odd-numbered column sub-pixel and the even-numbered column sub-pixel alternate one by one, or they are disposed by way of groups each including two odd-numbered column sub-pixels alternating with even-numbered column sub-pixels or by way of groups each including two even-numbered column sub-pixels alternating with odd-numbered column sub-pixels.

20 Claims, 3 Drawing Sheets

PIXEL ARRAY AND DISPLAY DEVICE

CROSS REFERENCE TO RELATED APPLICATIONS

This application claims priority under 35 U.S.C. §119 of Chinese Application No. 201410409400.8 filed on Aug. 19, 2014, the disclosure of which is incorporated by reference.

TECHNICAL FIELD

Embodiments of the present invention relate to a pixel array and a display device that includes the pixel array.

BACKGROUND

As a mainstream display at present, Liquid Crystal Displays have occupied the chief market for flat panel display by virtue of the advantages of small volume, thin thickness, low power consumption, etc., and the liquid crystal display technology is also in course of continuous development.

Figure 1:
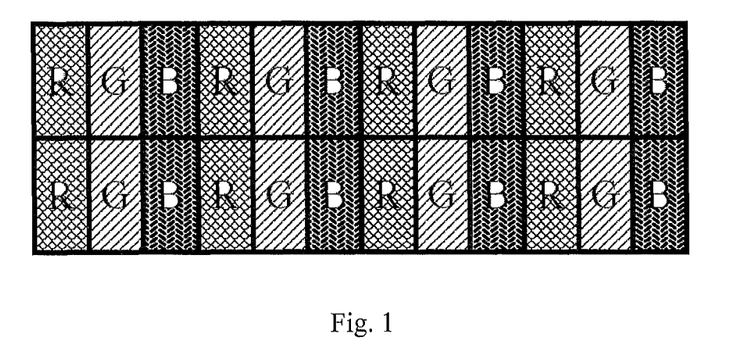
FIG. 1 is a schematic view illustrating a RGB pixel array.

FIG. 1 illustrates a pixel array of RGB sub-pixels of an existing liquid crystal display and a drive mode thereof. In the course of drive, in order to prevent a crosstalk phenomenon between adjacent sub-pixels, it is required that polarities of image signals applied across the adjacent sub-pixels be opposite. As illustrated in FIG. 1, in each row of sub-pixels, polarities of applied image signals change alternately between positive and negative.

Figure 2:
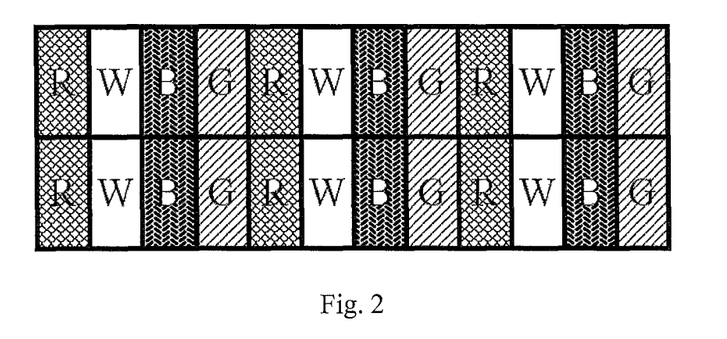
FIG. 2 is a schematic view illustrating a RGBW pixel array.

In order to increase brightness of liquid crystal displays, a pixel array of RGBW sub-pixels has been proposed, namely, on the basis of an original RGB pixel array, a white (w) sub-pixel is added. FIG. 2 illustrates a pixel array of RGBW. In each row of sub-pixels, they are arranged repetitively in the 'R-W-B-G' repetitive unit. In such a pixel array, a drive mode similar to that illustrated in FIG. 1 is carried out, namely, signal data for adjacent pixels have opposite polarities.

SUMMARY

According to an embodiment of the invention, there is provided a pixel array, comprising a two-dimensional array that is formed by arranging a plurality of color sub-pixels and a plurality of white sub-pixels in a row direction and in a column direction, the color sub-pixels include color sub-pixels in three different colors, wherein, in a same row, color sub-pixels with a same color lie in odd-numbered columns and even-numbered columns of the two-dimensional array, respectively, so as to form odd-numbered column sub-pixels and even-numbered column sub-pixels;

for color sub-pixels with each color in each row, color sub-pixels with the same color in the same row are arranged so that, the odd-numbered column sub-pixels and the even-numbered column sub-pixels alternate one by one, or they are disposed by way of groups each including two odd-numbered column sub-pixels alternating with even-numbered column sub-pixels or by way of groups each including two even-numbered column sub-pixels alternating with odd-numbered column sub-pixels.

In an example, as for sub-pixels of any one kind among the color sub-pixels in three different colors and the white sub-pixels, in the same row, adjacent sub-pixels with the same color are situated in odd-numbered columns and even-numbered columns of the two-dimensional array, respectively.

In an example, three color sub-pixels with different colors and bne white sub-pixel constitute one pixel group.

In an example, in each row of the two-dimensional array, a plurality of the pixel groups are arranged in sequence along the row direction.

In an example, in each of the pixel groups, the three color sub-pixels with different colors and the one white sub-pixel are classified into a first pixel sub-group and a second pixel sub-group that are arranged in the row direction, the first pixel sub-group and the second pixel sub-group include two adjacent sub-pixels, respectively; in any two adjacent pixel groups, the two adjacent sub-pixels in the first pixel sub-groups are arranged in different orders along the row direction, and the two adjacent sub-pixels in the second pixel sub-groups are arranged in different orders along the row direction.

In an example, the color sub-pixels include a red sub-pixel, a green sub-pixel and a blue sub-pixel, the first pixel sub-group includes one red sub-pixel and one white sub-pixel, and the second pixel sub-group includes one blue sub-pixel and one green sub-pixel.

In an example, in each row of the two-dimensional array, a repetitive unit of the pixel arrangement is at least one of the following repetitive units: R-W-B-G-W-R-G-B, W-R-G-B-R-W-B-G, G-W-R-B-W-G-B-R, W-G-B-R-G-W-R-B, W-B-G-R-B-W-R-G, wherein, R, B and W represent a red sub-pixel, a green sub-pixel, a blue sub-pixel and a white sub-pixel, respectively.

In an example, for color sub-pixels in each color in each row, color sub-pixels with the same color in the same row are arranged so that they are disposed by way of groups each including two odd-numbered column sub-pixels alternating with even-numbered column sub-pixels or by way of groups each including two even-numbered column sub-pixels alternating with odd-numbered column sub-pixels.

In an example, the pixel array includes a 12×4 two-dimensional repetitive unit, in the two-dimensional repetitive unit, a first-colored pixel column, a second-colored pixel column and a third-colored pixel column are included, a pixel column in each color is composed of three color sub-pixels with the same color and one white sub-pixel, and the first-colored pixel column, the second-colored pixel column and the third-colored pixel column are repetitively disposed in this order; in the first to fourth pixel columns, the white sub-pixel lies in a first row, a second row, a third row and a fourth row of the two-dimensional repetitive unit, respectively; in the fifth to eighth pixel columns, the white sub-pixel lies in the first row, the second row, the third row and the fourth row of the two-dimensional array, respectively; and in the ninth to twelfth pixel columns, the white sub-pixel lies in the first row, the second row, the third row and the fourth row of the two-dimensional array, respectively.

In an example, the two-dimensional repetitive unit is repetitively disposed in the row direction and the column direction of the two-dimensional array.

In an example, three color sub-pixels with different colors and one white sub-pixel constitute one pixel group, three adjacent pixel groups in the row direction of the two-dimensional array constitute one repetitive unit; in each row of pixels, the white sub-pixel is arranged in a same position in each pixel group; in each repetitive unit, sub-pixels in each color are arranged in positions different from each other in the three adjacent pixel groups.

In an example, for pixels in different rows, position of a white sub-pixel in each pixel group may be the same or differ.

According to another embodiment of the invention, there is provided a display device, comprising the pixel array according to any of the above embodiments.

In an example, the display device is a liquid crystal display, and the color sub-pixels include color filter in corresponding colors.

In an example, the display device includes a drive unit, configured to conduct a scanning in line sequence on the pixel array, and when sub-pixels in each row are driven, polarities of image data signals applied to the sub-pixels vary alternately in sequence.

In an example, the liquid crystal display is an ADS mode display.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

When a pixel array as illustrated in FIG. 2 works in such a drive mode that polarities of data signals across adjacent sub-pixels are opposite, because each repetitive unit includes four (even-numbered) sub-pixels (RGBW), sub-pixels with the same color in each row of sub-pixels have the same polarity. It is found by inventors that, crosstalk may be produced by such a construction when it appears in a specific picture pattern. The reason for the production of crosstalk is that, when adjacent sub-pixels with the same color are each charged in the same polarity in unit charge time of sub-pixels, under the influence of a data electrode, a common electrode shifts toward one side, resulting in a change of picture brightness. Upon drive, in the row direction, the polarity for each of sub-pixels may alternate between positive and negative, so as to achieve a better drive. Thus, the polarity of an image signal applied to each of sub-pixels corresponds to an odd-numbered column or even-numbered column position where the sub-pixel is located.

In the present specification, it is mainly directed to a pixel array including color sib-pixels and a white sub-pixel (W). In the following embodiments, descriptions will be given with reference to an example in which the color sub-pixels include a red sub-pixel (R), a green sub-pixel (G) and a blue sub-pixel (B). However, embodiments according to the invention are not limited to the above color sub-pixels, and for example, color sub-pixels may include sub-pixels in other three colors for color display, such as, a magenta sub-pixel, a cyan sub-pixel and a yellow sub-pixel.

In order to avoid crosstalk, it is preferred that the following drive can be realized for sub-pixels in each color among color sub-pixels, namely, drive polarities for the adjacent sub-pixels with the same color change alternately. For such a drive mode that polarities of positive and negative alternate, for example, adjacent sub-pixels with the same color lie in an odd-numbered column and an even-numbered column, respectively. As such, a crosstalk issue resulted from the fact that adjacent sub-pixels with the same color have the same polarity can be avoided. However, when polarities of sub-pixels with the same color varying alternately can be realized only for color sub-pixels, a function of preventing crosstalk may also be served. That is, embodiments of the invention are directed to a pixel array that includes a two-dimensional array formed by a plurality of color sub-pixels and a plurality of white sub-pixels. In the same row, color sub-pixels with the same color lie in odd-numbered columns and even-numbered columns of the two-dimensional array, respectively, so as to form odd-numbered column sub-pixels and even-numbered column sub-pixels. For color sub-pixels in each color in each row, color sub-pixels with the same color in the same row are arranged so that, the odd-numbered column sub-pixels and the even-numbered column sub-pixels alternate one by one, or they are disposed by way of groups each including two odd-numbered column sub-pixels alternating with even-numbered column sub-pixels or by way of groups each including two even-numbered column sub-pixels alternating with odd-numbered column sub-pixels.

In the specification, the pixel array refers to the arrangement mode of sub-pixels in various colors. By way of adjusting the arrangement mode of sub-pixels in various colors, crosstalk resulted from the fact that adjacent sub-pixels with the same color have the same polarity upon polarity inverting drive can be avoided by the prevent invention. The pixel array in the present invention can be applied to various flat panel display devices. For example, it can be applied to various liquid crystal display devices. In a liquid crystal display device, color in various sub-pixels is realized by color filters of corresponding colors. After or before light from a backlight is modulated by a liquid crystal layer, they pass through color filters of various colors to generate light in corresponding colors. With regard to a RGBW pixel array, through proportion allocation of various lights emitted by a R sub-pixel, a G sub-pixel, a B sub-pixel and a W sub-pixel, the color display of a variety of colors is achieved. Of course, for sub-pixels of each color, besides color filters of a corresponding color, a variety of other requisite components may also be included, such as, a thin film transistor functioning as a switch, a data line, a gate line, and so on. Embodiments according to the invention focus on the arrangement relationship between sub-pixels of various colors, and there is not a specific limit on the concrete structure of sub-pixels of each color. Therefore, descriptions of the concrete structure of sub-pixels are omitted in the specification.

Hereinafter, several embodiments according to the invention will be described in more detail, so that technical solutions according to the invention become clearer.

First Embodiment

Figure 3:
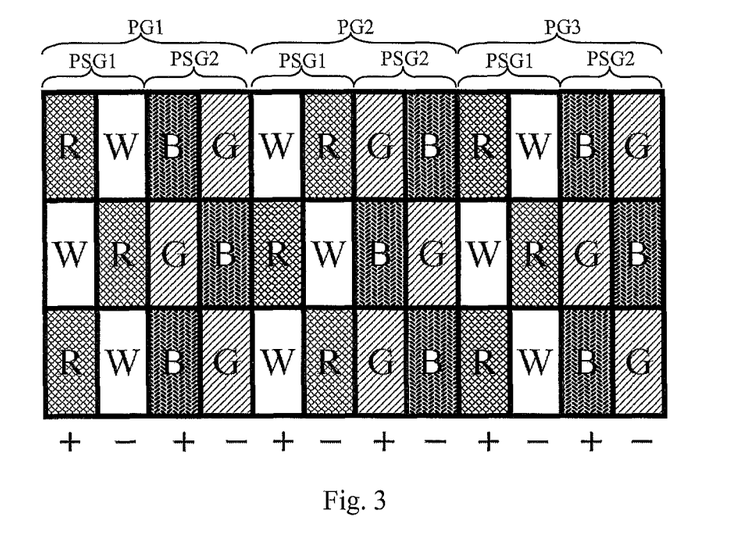
FIG. 3 is a schematic view illustrating a pixel array according to the first embodiment of the invention.

As illustrated in FIG. 3, in a two-dimensional array composed by sub-pixels of a variety of colors, color sub-pixels in three different colors and one white sub-pixel constitute one pixel group. For example, each pixel group includes one red sub-pixel, one green sub-pixel, one blue sub-pixel and one white sub-pixel. Sub-pixels in each pixel group are sequentially arranged in the row direction of the two-dimensional array, and a plurality of pixel groups are also sequentially arranged in the row direction. It is to be noted that, the pixel configuration illustrated in FIG. 3 merely schematically illustrates a part of the pixel array, rather than full of the pixel array. For example, in the pixel configuration of FIG. 3, three pixel groups arranged consecutively are included in each row, and each pixel group is composed by one red sub-pixel, one green sub-pixel, one blue sub-pixel and one white sub-pixel.

For each pixel group, it can be divided into two pixel sub-groups arranged sequentially in the row direction, wherein, one pixel sub-group includes two sub-pixels in the pixel group, and the other pixel sub-group includes the other two sub-pixels in the pixel group. Four pixels in each group are classified into a first pixel sub-group and a second pixel sub-group arranged in the row direction. For example, as illustrated in FIG. 3, for each pixel group, the first pixel sub-group includes a red sub-pixel and a white sub-pixel; and the second pixel sub-group includes a blue sub-pixel and a green sub-pixel. However, embodiments of the invention are not limited thereto, the first pixel sub-group may include sub-pixels of any two colors, and the second pixel sub-group may include sub-pixels of the remaining two colors. For example, the first pixel sub-group may include a green sub-pixel and a white sub-pixel, the second pixel sub-group may include a blue sub-pixel and a red sub-pixel; or, the first pixel sub-group may include a green sub-pixel and a red sub-pixel, the second pixel sub-group may include a blue sub-pixel and a white sub-pixel; or the first pixel sub-group may include a green sub-pixel and a blue sub-pixel, the second pixel sub-group may include a red sub-pixel and a white sub-pixel.

As illustrated in FIG. 3, in pixel groups that are adjacent in the row direction, sub-pixels in the first pixel sub-groups in the two pixel groups have different arranging orders in the row direction, and sub-pixels in the second pixel sub-groups in the two pixel groups have different arranging orders in the row direction. For example, three pixel groups are included in a first row in FIG. 3. For the sake of illustrative convenience, they are named as a first pixel group PG1, a second pixel group PG2 and a third pixel group PG3 in the left-to-right order, respectively. With regard to the first pixel group PG1 and the second pixel group PG2 that are adjacent, the case with a first pixel sub-group PSG1 in the first pixel group PG1 is that a red sub-pixel is ahead of a white sub-pixel; the case with a first pixel sub-group PSG1 in the second pixel group PG2 is that a white sub-pixel is ahead of a red sub-pixel; the case with a second pixel sub-group PSG2 in the first pixel group PG1 is that a blue sub-pixel is ahead of a green sub-pixel; the case with a second pixel sub-group PSG2 in the second pixel group PG2 is that a green sub-pixel is ahead of a blue sub-pixel. Similarly, with regard to the second pixel group PG2 and the third pixel group PG3 that are adjacent, the case with a first pixel sub-group PSG1 in the second pixel group PG2 is that a white sub-pixel is ahead of a red sub-pixel; the case with a first pixel sub-group PSG1 in the third pixel group PG3 is that a red sub-pixel is ahead of a white sub-pixel; the case with a second pixel sub-group PSG2 in the second pixel group PG2 is that a green sub-pixel is ahead of a white sub-pixel; the case with a second pixel sub-group PSG2 in the third pixel group PG3 is that a blue sub-pixel is ahead of a green sub-pixel. For adjacent pixel groups in other row, they have an arranging mode similar to that stated above. However, embodiments according to the invention are not limited to such an order, as long as first pixel sub-groups in adjacent pixel groups have different arranging orders, and second pixel sub-groups in the two pixel groups have different arranging orders.

In addition, for pixel configuration in different rows, adjacent rows may have exactly the same pixel arrangement. Certainly, adjacent rows may also have different pixel arrangements. In the embodiment, it is necessary for each row to meet such a requirement that first pixel sub-groups in adjacent pixel groups have different arranging orders, and second pixel sub-groups in the two pixel groups have different arranging orders.

As can be seen from FIG. 3, for adjacent sub-pixels with the same color, they are located in odd-numbered columns and even-numbered columns, respectively. For example, in a first row in FIG. 3, in the left-to-right order in the figure, the first red sub-pixel lies in an odd-numbered column, the second red sub-pixel lies in an even-numbered column, the third red sub-pixel lies in an odd-numbered column; the first white sub-pixel lies in an even-numbered column, the second white sub-pixel lies in an odd-numbered column, the third white sub-pixel lies in an even-numbered column; the first blue sub-pixel lies in an odd-numbered column, the second blue sub-pixel lies in an even-numbered column, the third blue sub-pixel lies in an odd-numbered column; the first green sub-pixel lies in an even-numbered column, the second green sub-pixel lies in an odd-numbered column, the third green sub-pixel lies in an even-numbered column. For other rows, there is an arranging mode similar to the above. That is, for sub-pixels of each color (including color pixels and white sub-pixels), adjacent sub-pixels with the same color are located in an odd-numbered column and an even-numbered column, respectively.

In each row, sub-pixels with the same color are disposed in odd-numbered columns and even-numbered columns of the two-dimensional array, respectively. For the sake of illustrative convenience, a sub-pixel situated in an odd-numbered column is referred to as an odd-numbered column sub-pixel, and a sub-pixel situated in an even-numbered column is referred to as an even-numbered sub-pixel. As can be seen from FIG. 3, in the same row, as regards sub-pixels with the same color (including color sub-pixels and white sub-pixels), the odd-numbered column sub-pixels and the even-numbered column sub-pixels alternate one by one. That is, they are disposed repetitively in a repetitive manner 'one odd-numbered column sub-pixel, one even-numbered column sub-pixel, one odd-numbered column sub-pixel, one even-numbered column sub-pixel . . . '. For example, with regard to red sub-pixels in the first row in FIG. 3, they are a red odd-numbered column sub-pixel, a red even-numbered column sub-pixel, a red odd-numbered column sub-pixel . . . in this order. With regard to white sub-pixels in the first row in FIG. 3, they are a white even-numbered column sub-pixel, a white odd-numbered column sub-pixel, a white even-numbered column sub-pixel . . . in this order. With regard to blue and green sub-pixels in the first row, they have arranging modes similar to those of the red and white sub-pixels as stated above, and details are omitted here.

Therefore, as regards the pixel array according to the present embodiment, when such a drive mode that polarity of a drive voltage (an image data signal) varies alternately is adopted, the polarity of a drive voltage for an odd-numbered column and the polarity of a drive voltage for an even-numbered column correspond to a positive polarity and a negative polarity, respectively. Owing to the fact that in the embodiment, for adjacent sub-pixels with the same color, they are located in an odd-numbered column and an even-numbered column of a two-dimensional array, respectively, drive voltages for adjacent sub-pixels with the same color have different polarities. As such, crosstalk resulted from the fact that adjacent sub-pixels with the same color have the same polarity can be prevented.

As can be known from the above descriptions of the pixel array of the present embodiment, in each row of the two-dimensional array of the pixel array, the repetitive unit of the pixel arrangement may be at least one of the following repetitive units: R-W-B-G-W-R-G-B, W-R-G-B-R-W-B-G, G-W-R-B-W-G-B-R, W-G-B-R-G-W-R-B, B-W-R-G-W-B-G-R, W-B-G-R-B-W-R-G, wherein, R, G, B and W represent a red sub-pixel, a green sub-pixel, a blue sub-pixel and a white sub-pixel, respectively.

Second Embodiment

In the above first embodiment, with regard to sub-pixels of all colors (including color sub-pixels and white sub-pixels), adjacent sub-pixels with the same color are located in an odd-numbered row and an even-numbered row, respectively. That is, the column where sub-pixels of the same color are located varies alternately by way of odd one alternating with even one. However, in case of color sub-pixels with the same color, in the same row, if they are disposed alternately by way of groups each including two odd-numbered column sub-pixels alternating with even-numbered column sub-pixels or groups each including two even-numbered column sub-pixels alternating with odd-numbered column sub-pixels, crosstalk can also be prevented. As can be known from the principle of a RGBW pixel construction, W sub-pixels are to be driven with the aim of increasing brightness, and there is no such case where only W sub-pixels are driven. Only in the case that all of R, G and B sub-pixels are driven, W sub-pixels are driven. In this case, the average value of positive and negative polarities for all the pixels in the same row approximates to zero. Therefore, in terms of a white sub-pixel, the polarity issue when it is driven may not be taken into consideration separately. According to the second embodiment of the invention, there is provided a pixel array configured in the above mode, which will be described in detail hereinafter.

Figure 4:
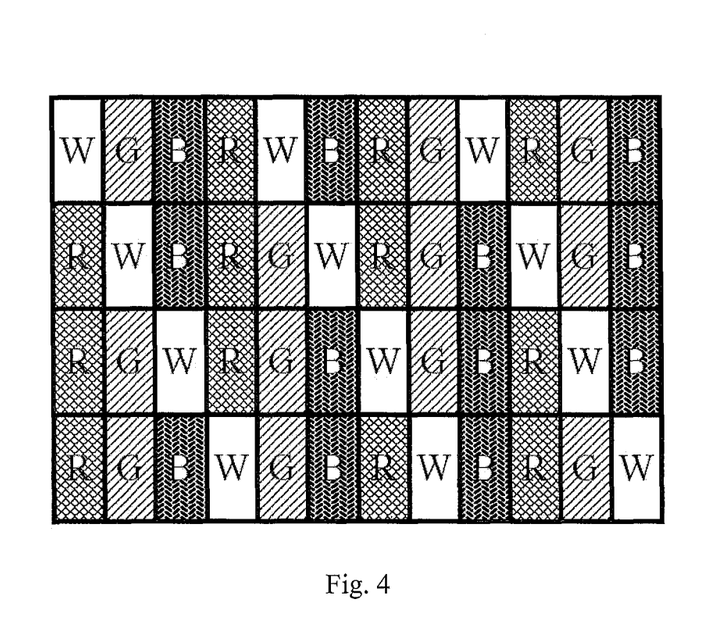
FIG. 4 is a schematic view illustrating a pixel array according to the second embodiment of the invention.

For example, the pixel array includes a 12×4 two-dimensional repetitive unit. FIG. 4 illustrates the two-dimensional repetitive unit in the pixel array. In the two-dimensional repetitive unit, a first-colored pixel column, a second-colored pixel column and a third-colored pixel column are included, a pixel column in each color is composed of three color sub-pixels with the same color and one white sub-pixel, and the first-colored pixel column, the second-colored pixel column and the third-colored pixel column are repetitively disposed in this order. In the first to fourth pixel columns, the white sub-pixel lies in a first row, a second row, a third row and a fourth row of the two-dimensional repetitive unit, respectively; in the fifth to eighth pixel columns, the white sub-pixel lies in the first row, the second row, the third row and the fourth row of the two-dimensional array, respectively; and in the ninth to twelfth pixel columns, the white sub-pixel lies in the first row, the second row, the third row and the fourth row of the two-dimensional array, respectively.

The above two-dimensional repetitive unit can be repetitively disposed in the row and column directions, so as to constitute a pixel array that is two-dimensionally arranged. As can be seen from FIG. 4, in each row, white sub-pixels each are situated in an odd-numbered column or each are situated in an even-numbered column. That is, when they are driven in alternate positive and negative polarities, drive voltages for white sub-pixels may be in the same polarity.

For example, in the first row, consecutive red sub-pixels lie in an even-numbered column, an odd-numbered column and an even-numbered column, respectively, and if the repetitive unit is repeated in the row direction, then locations are an even-numbered column, an odd-numbered column, an even-numbered column, an even-numbered column, an odd-numbered column, an even-numbered column, an even-numbered column, an odd-numbered column, an even-numbered column . . . in turn. Therefore, for red sub-pixels in the first row, they are disposed by way of groups each including two even-numbered column sub-pixels alternating with odd-numbered column sub-pixels.

For example, in the first row, consecutive blue sub-pixels lie in an odd-numbered column, an even-numbered column and an even-numbered column, respectively, and if the repetitive unit is repeated in the row direction, then locations are an odd-numbered column, an even-numbered column and an even-numbered column, an odd-numbered column, an even-numbered column and an even-numbered column, an odd-numbered column, an even-numbered column and an even-numbered column . . . in turn. Therefore, for blue sub-pixels in the first row, they are disposed by way of groups each including two even-numbered column sub-pixels alternating with odd-numbered column sub-pixels. In addition, in the first row, green sub-pixels also have an arrangement similar to that stated above, and details are omitted here.

For example, in a second row, consecutive blue sub-pixels lie in an odd-numbered column, an odd-numbered column and an even-numbered column, respectively, and if the repetitive unit is repeated in the row direction, then locations are an odd-numbered column, an odd-numbered column and an even-numbered column, an odd-numbered column, an odd-numbered column and an even-numbered column, an odd-numbered column, an odd-numbered column and an even-numbered column . . . in turn. Therefore, for blue sub-pixels in the second row, they are disposed by way of groups each including two odd-numbered column sub-pixels alternating with even-numbered column sub-pixels.

Therefore, in the pixel array of the second embodiment, with regard to color sub-pixels in each row, in the same row, they are disposed by way of groups each including two odd-numbered column sub-pixels alternating with even-numbered column sub-pixels or by way of groups each including two even-numbered column sub-pixels alternating with odd-numbered column sub-pixels.

In fact, in such a drive mode that an image data signal is applied in alternate positive and negative polarities, an odd-numbered column or even-numbered column position where a sub-pixel is located just corresponds to positive or negative of the driving polarity. In a pixel array according to the embodiment, polarities of sub-pixels with the same color in the same row also vary, but their polarities vary alternately by way of two positive one negative or two negative one positive. With this construction, a crosstalk phenomenon can also be prevented.

Third Embodiment

Figure 5:
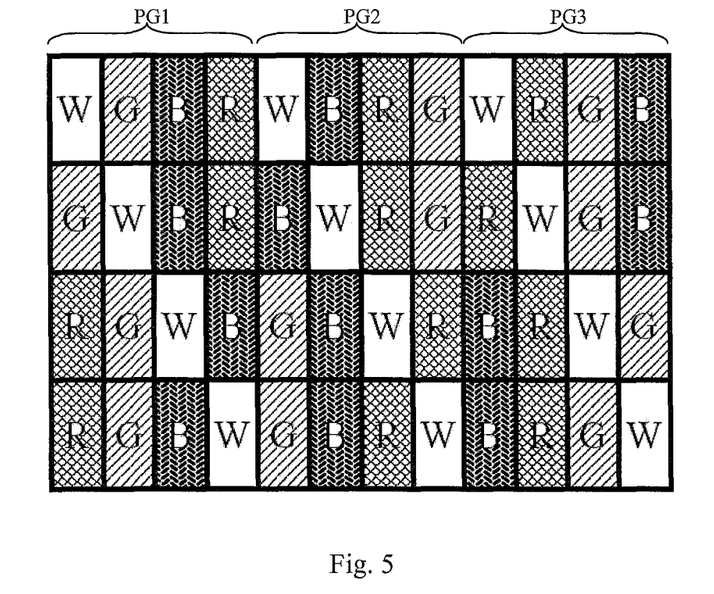
FIG. 5 is a schematic view illustrating a pixel array according to the third embodiment of the invention.

FIG. 5 illustrates a part of a pixel array according to another embodiment of the invention. In fact, the arranging mode for each row of the pixel array according to the embodiment is similar to the arranging mode for the first row or the fourth row in the pixel array of FIG. 4.

As illustrated in FIG. 5, three color sub-pixels with different colors and one white sub-pixel constitute one pixel group. In the row direction of the two-dimensional array of the pixel array, three adjacent pixel groups constitute one repetitive unit. In each row of pixels, white sub-pixels of each pixel group have the same arranging position. 'Same arranging position' here refers to a relative position of the sub-pixel in the pixel group. For example, in a first row in FIG. 5, the white sub-pixel in each pixel group is at the location of the first sub-pixel of a respective pixel group. In a second row, the white sub-pixel in each pixel group is at the location of the second sub-pixel of a respective pixel group. However, there is no corresponding relationship between the arranging position of a white sub-pixel and the row number, and it is only required that the arranging positions of white sub-pixels in respective pixel groups in the same row be the same.

In each repetitive unit, the arranging positions of sub-pixels in each color in the three pixel groups are different from each other. For example, in the first row in FIG. 5, a green sub-pixel of a first pixel group PG1 is at the location of the second sub-pixel, a green sub-pixel of a second pixel group PG2 is at the location of the fourth sub-pixel, and a green sub-pixel of a third pixel group PG3 is at the location of the third sub-pixel; a blue sub-pixel of the first pixel group PG1 is at the location of the third sub-pixel, a blue sub-pixel of the second pixel group PG2 is at the location of the second sub-pixel, and a blue sub-pixel of the third pixel group PG3 is at the location of the first sub-pixel; a red sub-pixel of the first pixel group PG1 is at the location of the fourth sub-pixel, a red sub-pixel of the second pixel group PG2 is at the location of the third sub-pixel, and a red sub-pixel of the third pixel group PG3 is at the location of the second sub-pixel. As for a second row to a fourth row, they have arranging modes similar to that of the first row, and details are omitted here.

For example, in pixels in different rows, the position of a white sub-pixel in each sub-pixel group may be the same or differs.

As seen from the pixel array of FIG. 5, with regard to color sub-pixels in each color in each row, color sub-pixels with the same color in the same row are arranged so that they are disposed alternately by way of groups each including two odd-numbered column sub-pixels alternating with even-numbered column sub-pixels or by way of groups each including two even-numbered column sub-pixels alternating with odd-numbered column sub-pixels. In such a drive mode that an image data signal is applied in alternate positive and negative polarities, an odd-numbered column or even-numbered column position where a sub-pixel is located just corresponds to positive or negative of the driving polarity. In a pixel array according to the embodiment, polarities of sub-pixels with the same color in the same row also vary, but their polarities vary alternately by way of two positive one negative or two negative one positive. With this construction, a crosstalk phenomenon can also be prevented.

Comparison Between a Normal Picture and a Crosstalk Picture

Figure 6A:
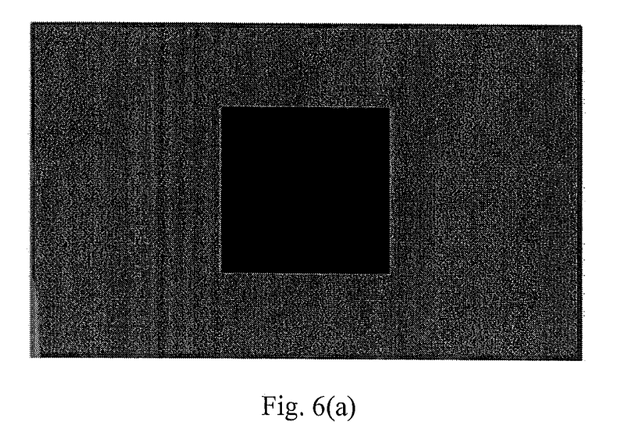
FIGS. 6(a) and 6(b) are schematic views illustrating a normal display picture and a crosstalk picture.
Figure 6B:
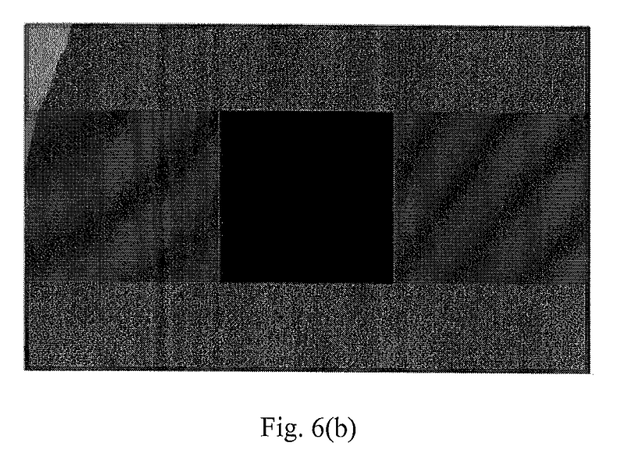

FIG. 6(a) and FIG. 6(b) are a schematic view illustrating a picture situation of a pixel array according to embodiments of the invention and a schematic view illustrating a picture situation of a pixel array according to that illustrated in FIG. 2, respectively. FIG. 6(a) indicates a normal picture displayed by the pixel array according to embodiments of the invention, wherein, a black rectangle in the middle denotes a black display zone, and grey around it denotes a display zone in a certain color (such as, red). As illustrated in FIG. 6(b), in the RGBW pixel array illustrated in FIG. 2, in such a drive mode that an image data signal is applied in alternate positive and negative polarities, crosstalk occurs, thus resulting in change of the picture brightness. Thereby, this causes the color of the monochromic display zone on both sides of the black rectangle to vary. As can be known by comparison between FIG. 6(a) and FIG. 6(b), with the pixel array according to embodiments of the invention, the crosstalk phenomenon can be avoided.

According to an embodiment of the present disclosure, there is further provided a display device, comprising a pixel array according to the above various embodiments. For example, the display device according to embodiments of the invention is a liquid crystal display, the color sub-pixels include color filters in respective colors, sub-pixels in various colors are implemented by color filters in respective colors. The color filters may be a structure formed on a color filter substrate, and may also be a structure formed on an array substrate (COA), there is no specific limit on this in the liquid crystal display according to embodiments of the invention. Embodiments according to the invention do not set a specific limit on the type of the liquid crystal display, and for example, it may be an advanced super-dimensional (ADS) liquid crystal display.

For the liquid crystal display according to embodiments of the invention, it may further include a drive unit, configured to conduct a scanning in line sequence on the pixel array. When sub-pixels in each row of pixels are driven, polarities of image data signals applied to the sub-pixels vary alternately in sequence. Thus, not only crosstalk resulted from the fact that adjacent sub-pixels have the same polarity can be prevented, but also crosstalk resulted from the fact that adjacent sub-pixels with the same color have the polarity can be prevented.

Descriptions made above are merely some concrete embodiments according to the invention. As for pixel arrays illustrated in FIG. 3 and FIG. 5, each pixel group includes sub-pixels in four colors of R, G, B and W, and therefore, each pixel group can constitute one pixel unit for color display. While for the pixel array illustrated in FIG. 4, a first row and a fourth row in the two-dimensional repetitive unit each can be divided into pixel groups including sub-pixels in four colors of R, G, B and W, each pixel group in the first row may constitute one pixel unit together with four sub-pixels adjacent to it in a second row for color display, while each pixel group in the fourth row may constitute one pixel unit together with four sub-pixels adjacent to it in the second row for color display. However, the division mode of a pixel unit according to the invention is not limited to the above various concrete circumstances.

In the above descriptions, only FIG. 3 illustrates the polarity of an image data signal applied to each column, and pixel arrays illustrated in FIG. 4 and FIG. 5 as well as other pixel array according to embodiments of the invention have similar drive modes. Thus, denotation of the polarity for each column is omitted in FIG. 4 and FIG. 5. In addition, the alternate change starts with a first column being in a positive polarity in FIG. 3, but embodiments according to the invention are not limited thereto. It may also be possible that the alternate change starts with a first column being in a negative polarity.

Descriptions made above are merely exemplary embodiments of the invention, but are not used to limit the protection scope of the invention. The protection scope of the invention is determined by attached claims.

The present disclosure contains subject matter related to that disclosed in Chinese Priority Patent Application CN201410409400.8 filed on Aug. 19, 2014, the entire contents of which are hereby incorporated by reference.

The invention claimed is:

1. A pixel array, comprising a two-dimensional array that is formed by arranging a plurality of color sub-pixels and a plurality of white sub-pixels in a row direction and in a column direction, the plurality of color sub-pixels include color sub-pixels in three different colors, wherein, in a same row, color sub-pixels with a same color lie in odd-numbered columns and even-numbered columns of the two-dimensional array, respectively, so as to form odd-numbered column sub-pixels and even-numbered column sub-pixels;

for color sub-pixels with each color in each row, color sub-pixels with the same color in the same row are arranged so that, the odd-numbered column sub-pixels and the even-numbered column sub-pixels alternate one by one, or they are disposed by way of groups each including two odd-numbered column sub-pixels alternating with even-numbered column sub-pixels or by way of groups each including two even-numbered column sub-pixels alternating with odd-numbered column sub-pixels.

2. The pixel array according to claim 1, wherein, as for sub-pixels of any one kind among the color sub-pixels in three different colors and the white sub-pixels, in the same row, adjacent sub-pixels with the same color are situated in odd-numbered columns and even-numbered columns of the two-dimensional array, respectively.

3. The pixel array according to claim 1, wherein, three color sub-pixels with different colors and one white sub-pixel constitute one pixel group.

4. The pixel array according to claim 2, wherein, three color sub-pixels with different colors and one white sub-pixel constitute one pixel group.

5. The pixel array according to claim 3, wherein, in each row of the two-dimensional array, a plurality of the pixel groups are arranged in sequence along the row direction.

6. The pixel array according to claim 5, wherein, in each of the pixel groups, the three color sub-pixels with different colors and the one white sub-pixel are classified into a first pixel sub-group and a second pixel sub-group that are arranged in the row direction, the first pixel sub-group and the second pixel sub-group include two adjacent sub-pixels, respectively; in any two adjacent pixel groups, the two adjacent sub-pixels in the first pixel sub-groups are arranged in different orders along the row direction, and the two adjacent sub-pixels in the second pixel sub-groups are arranged in different orders along the row direction.

7. The pixel array according to claim 6, wherein, the plurality of color sub-pixels include a red sub-pixel, a green sub-pixel and a blue sub-pixel, the first pixel sub-group includes one red sub-pixel and one white sub-pixel, and the second pixel sub-group includes one blue sub-pixel and one green sub-pixel.

8. The pixel array according to claim 6, wherein, in each row of the two-dimensional array, a repetitive unit of the pixel arrangement is at least one of the following repetitive units: R-W-B-G-W-R-G-B, W-R-G-B-R-W-B-G, G-W-R-B-W-G-B-R, W-G-B-R-G-W-R-B, B-W-R-G-W-B-G-R, W-B-G-R-B-W-R-G, wherein, R, G, B and W represent a red sub-pixel, a green sub-pixel, a blue sub-pixel and a white sub-pixel, respectively.

9. The pixel array according to claim 7, wherein, in each row of the two-dimensional array, a repetitive unit of the pixel arrangement is at least one of the following repetitive units: R-W-B-G-W-R-G-B, W-R-G-B-R-W-B-G, G-W-R-B-W-G-B-R, W-G-B-R-G-W-R-B, B-W-R-G-W-B-G-R, W-B-G-R-B-W-R-G, wherein, R, G, B and W represent a red sub-pixel, a green sub-pixel, a blue sub-pixel and a white sub-pixel, respectively.

10. The pixel array according to claim 1, wherein, for color sub-pixels in each color in each row, color sub-pixels with the same color in the same row are arranged so that they are disposed by way of groups each including two odd-numbered column sub-pixels alternating with even-numbered column sub-pixels or by way of groups each including two even-numbered column sub-pixels alternating with odd-numbered column sub-pixels.

11. The pixel array according to claim 1, wherein, the pixel array includes a 12×4 two-dimensional repetitive unit, in the two-dimensional repetitive unit, a first-colored pixel column, a second-colored pixel column and a third-colored pixel column are included, a pixel column in each color is composed of three color sub-pixels with the same color and one white sub-pixel, and the first-colored pixel column, the second-colored pixel column and the third-colored pixel column are repetitively disposed in this order; in the first to fourth pixel columns, the white sub-pixel lies in a first row, a second row, a third row and a fourth row of the two-dimensional repetitive unit, respectively; in the fifth to eighth pixel columns, the white sub-pixel lies in the first row, the second row, the third row and the fourth row of the two-dimensional array, respectively; and in the ninth to twelfth pixel columns, the white sub-pixel lies in the first row, the second row, the third row and the fourth row of the two-dimensional array, respectively.

12. The pixel array according to claim 11, wherein, the two-dimensional repetitive unit is repetitively disposed in the row direction and the column direction of the two-dimensional array.

13. The pixel array according to claim 1, wherein, three color sub-pixels with different colors and one white sub-pixel constitute one pixel group, three adjacent pixel groups in the row direction of the two-dimensional array constitute one repetitive unit; in each row of pixels, the white sub-pixel is arranged in a same position in each pixel group; in each repetitive unit, sub-pixels in each color are arranged in positions different from each other in the three adjacent pixel groups.

14. The pixel array according to claim 13, wherein, for pixels in different rows, position of a white sub-pixel in each pixel group may be the same or differ.

15. A display device, comprising a pixel array including a two-dimensional array that is formed by arranging a plurality of color sub-pixels and a plurality of white sub-pixels in a row direction and in a column direction, the plurality of color sub-pixels include color sub-pixels in three different colors, wherein, in a same row, color sub-pixels with a same color lie in odd-numbered columns and even-numbered columns of the two-dimensional array, respectively, so as to form odd-numbered column sub-pixels and even-numbered column sub-pixels;

for color sub-pixels with each color in each row, color sub-pixels with the same color in the same row are arranged so that, the odd-numbered column sub-pixels and the even-numbered column sub-pixels alternate one by one, or they are disposed by way of groups each including two odd-numbered column sub-pixels alternating with even-numbered column sub-pixels or by way of groups each including two even-numbered column sub-pixels alternating with odd-numbered column sub-pixels.

16. The display device according to claim 15, wherein, as for sub-pixels of any one kind among the color sub-pixels in three different colors and the white sub-pixels, in the same row, adjacent sub-pixels with the same color are situated in odd-numbered columns and even-numbered columns of the two-dimensional array, respectively.

17. The display device according to claim 15, wherein, three color sub-pixels with different colors and one white sub-pixel constitute one pixel group.

18. The display device according to claim 17, wherein, in each row of the two-dimensional array, a plurality of the pixel groups are arranged in sequence along the row direction.

19. The display device according to claim 18, wherein, in each of the pixel groups, the three color sub-pixels with different colors and the one white sub-pixel are classified into a first pixel sub-group and a second pixel sub-group that are arranged in the row direction, the first pixel sub-group and the second pixel sub-group include two adjacent sub-pixels, respectively; in any two adjacent pixel groups, the two adjacent sub-pixels in the first pixel sub-groups are arranged in different orders along the row direction, and the two adjacent sub-pixels in the second pixel sub-groups are arranged in different orders along the row direction.

20. The display device according to claim 19, wherein, in each row of the two-dimensional array, a repetitive unit of the pixel arrangement is at least one of the following repetitive units: R-W-B-G-W-R-G-B, W-R-G-B-R-W-B-G, G-W-R-B-W-G-B-R, W-G-B-R-G-W-R-B, B-W-R-G-W-B-G-R, W-B-G-R-B-W-R-G, wherein, R, G, B and W represent a red sub-pixel, a green sub-pixel, a blue sub-pixel and a white sub-pixel, respectively.

* * * * *